United States Patent
Gosi et al.

(10) Patent No.: US 9,744,819 B2
(45) Date of Patent: Aug. 29, 2017

(54) METAL VALVE OF THE CLAMP-IN TYPE FOR INFLATING TYRES ASSOCIABLE WITH A TPMS TRANSDUCER

(71) Applicant: WONDER SPA, Cremona (IT)

(72) Inventors: Matteo Gosi, Cremona (IT); Stefano Cazzanti, Cremona (IT); Andrea Capelli, Cremona (IT); Gabriele Foglia, Cremona (IT)

(73) Assignee: WONDER SPA, Cremona (IT)

( * ) Notice: Subject to any disclaimer, the term of this patent is extended or adjusted under 35 U.S.C. 154(b) by 0 days.

(21) Appl. No.: 14/758,574

(22) PCT Filed: Jan. 8, 2014

(86) PCT No.: PCT/IT2014/000002
§ 371 (c)(1),
(2) Date: Jun. 30, 2015

(87) PCT Pub. No.: WO2014/108926
PCT Pub. Date: Jul. 17, 2014

(65) Prior Publication Data
US 2015/0343861 A1 Dec. 3, 2015

(30) Foreign Application Priority Data
Jan. 9, 2013 (IT) .............................. CR2013A0001

(51) Int. Cl.
*F16K 15/20* (2006.01)
*B60C 23/04* (2006.01)
(Continued)

(52) U.S. Cl.
CPC ...... *B60C 23/0498* (2013.01); *B60C 23/0408* (2013.01); *B60C 23/0494* (2013.01);
(Continued)

(58) Field of Classification Search
CPC .............. B60C 23/0494; B60C 29/005; B60C 23/0408; B60C 23/0498; B60C 29/02;
(Continued)

(56) References Cited

U.S. PATENT DOCUMENTS 1,957,605 A * 5/1934 Lamont ................. F16L 19/065
277/622
3,167,333 A * 1/1965 Hall ....................... F16L 15/003
138/44
(Continued)

FOREIGN PATENT DOCUMENTS

EP    1241028 A1   9/2002
EP    1277601 A2   1/2003

OTHER PUBLICATIONS

International Search Report, dated Jun. 13, 2014, from corresponding PCT application.

*Primary Examiner* — Craig J Price
(74) *Attorney, Agent, or Firm* — Young & Thompson

(57) ABSTRACT

Valves for inflating tires of tired wheels, in particular tires for vehicles, wherein the term "vehicles" refers to motor vehicles, vans, trucks, motorcycles or in general elements of locomotion on tires. More in detail, a metal valve (1) of the clamp-in type for inflating tires (2) associable with a TPMS transducer (3) by a locking screw (4) and arranged to be mounted, by a fixing system including a nut (5) adapted to screw onto a thread (18) provided on the stem (8) of the valve (1), on a rim (6) of a wheel, wherein the fixing system includes an element (7) that irreversibly yields when a preset tightening torque is reached for the locking nut (5), and wherein the element (7) that irreversibly yields is associated with the stem (8) of the valve (1).

19 Claims, 3 Drawing Sheets

(51) Int. Cl.
B60C 29/02 (2006.01)
B60C 29/00 (2006.01)

(52) U.S. Cl.
CPC ............ B60C 29/005 (2013.01); B60C 29/02 (2013.01); F16K 15/205 (2013.01); *Y10T 137/3662* (2015.04); *Y10T 137/3724* (2015.04)

(58) Field of Classification Search
CPC ......... Y10T 137/3662; Y10T 137/3724; Y10T 137/374; Y10T 137/3755; Y10T 137/1662; Y10T 137/1684; Y10T 137/71; Y10T 137/7256; F16K 15/205; F16L 2201/10; F16L 2201/60; F16L 2201/80; F16L 19/0212; F16L 19/0218
USPC ... 137/232, 233, 797, 800, 67, 68.15, 68.18, 137/384, 385; 152/428; 73/146.8; 220/265, 268, 796; 138/89.1–89.4; 285/92, 382.7, 3, 245, 249, 139.1, 139.2; 403/21, 22; 411/319; 277/917; 251/152
See application file for complete search history.

(56) References Cited

U.S. PATENT DOCUMENTS

| | | | | |
|---|---|---|---|---|
| 3,622,167 A * | 11/1971 | Velthoven | ............... | F16B 39/24 277/630 |
| 3,848,905 A * | 11/1974 | Hammer | ............... | F16L 19/061 285/288.1 |
| 4,410,185 A * | 10/1983 | Sporre | ................... | F16J 15/024 206/303 |
| 4,540,205 A * | 9/1985 | Watanabe | ........... | F16L 19/0212 285/329 |
| 4,645,242 A * | 2/1987 | Coleman | ............... | F16L 41/082 285/141.1 |
| 4,767,135 A * | 8/1988 | Holzmann | ........... | H02G 3/0658 285/23 |
| 5,378,027 A * | 1/1995 | Gehring | ............... | H02G 3/0675 285/322 |
| 6,557,406 B2 | 5/2003 | Gabelmann | | |
| 6,862,929 B2 * | 3/2005 | Luce | ................... | B60C 23/0494 73/146.3 |
| 6,912,897 B2 * | 7/2005 | Luce | ................... | B60C 23/0494 340/442 |
| 7,350,828 B2 * | 4/2008 | Williams | ................ | F16L 19/14 285/245 |
| 7,407,196 B2 * | 8/2008 | Bennett | ................... | F16L 19/14 285/249 |
| 7,516,653 B2 * | 4/2009 | Blossfeld | ............ | B60C 23/0408 73/146.8 |
| 8,490,479 B2 * | 7/2013 | Cazzanti | ............. | B60C 23/0408 73/146.2 |
| 9,365,083 B2 * | 6/2016 | Lu | ........................ | B60C 23/0494 |
| 2012/0235809 A1 * | 9/2012 | Cantarelli | ........... | B60C 23/0408 340/445 |
| 2014/0124048 A1 * | 5/2014 | Wawrla | ................. | E03C 1/0403 137/315.01 |

* cited by examiner

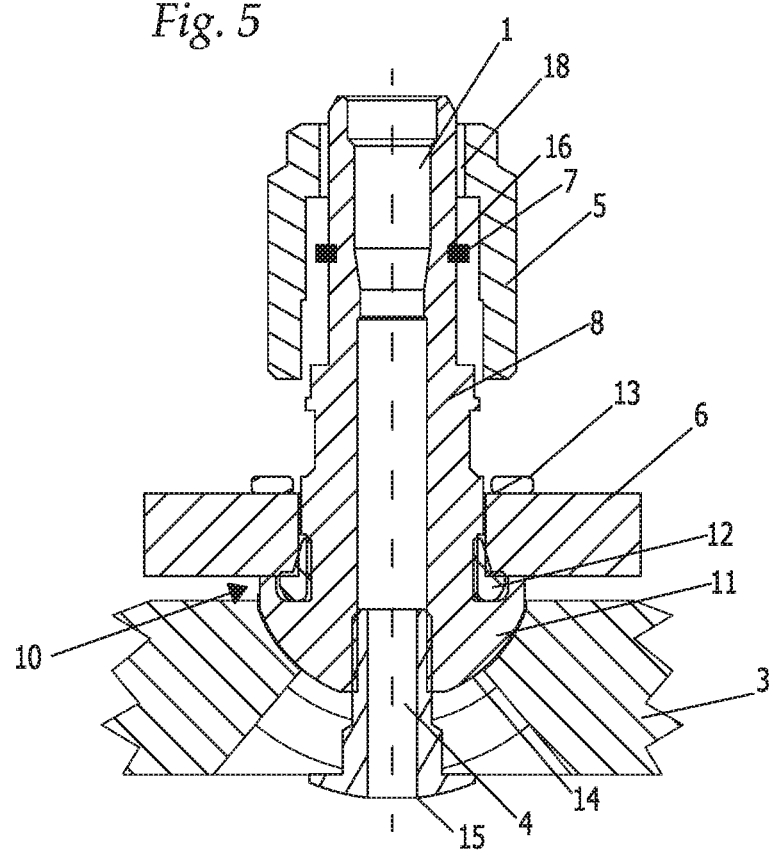
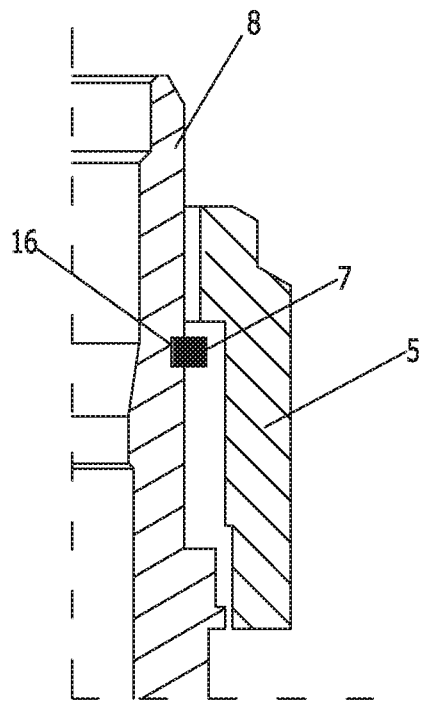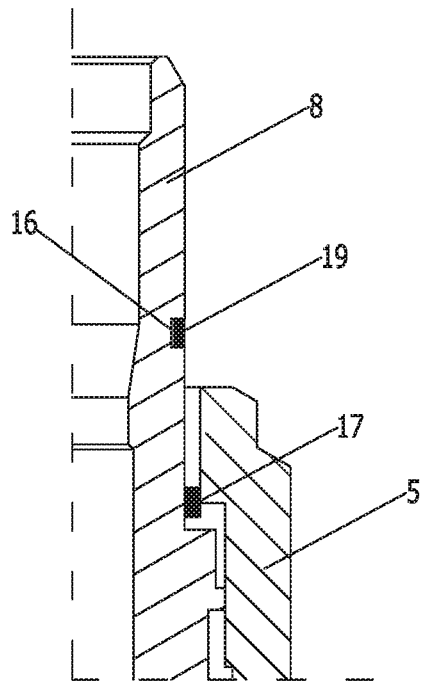

METAL VALVE OF THE CLAMP-IN TYPE FOR INFLATING TYRES ASSOCIABLE WITH A TPMS TRANSDUCER

BACKGROUND OF THE INVENTION

Field of the Invention

The present invention relates to the sector of valves for inflating tyres of tyred wheels, in particular tyres for vehicles, wherein the term "vehicles" refers to motor vehicles, vans, trucks, motorcycles or in general means of locomotion on tyres.

More in detail, the invention relates to a controlled tightening metal valve of the clamp-in type designed to be used in the context of TPMS (Tire Pressure Monitoring System) technology, in which electronic sensors for the detection and transmission of certain tyre operating parameters, in particular pressure, but also temperature, for example, are mounted directly on the valve itself and the valve is fixed to the wheel by means of a hole made in the rim.

Description of the Related Art

Metal valves of the clamp-in type generally consist of a shaped head, usually cylindrical or semispherical or polygonal, which is associated with a transducer containing the electronic sensors, and of an elongated stem (or rod) to enable the tyre inflation/deflation operations and to fix said valve to the wheel rim by means of specific screw fastening means.

Said screw fastening means generally consist of a nut which screws onto a thread obtained on the portion of the valve stem projecting outside the rim.

Operationally, the valve and the transducer are first joined together in a valve-transducer assembly by means of a perforated fixing screw. Said screw is generally provided with a square head, and is adapted to axially block the head of the valve in a specific complementary seat provided in the transducer.

At a later stage, the valve-transducer assembly is positioned on the wheel rim so that the valve projects outside the rim and the transducer is housed within the tyre, and rests on the inner flange of the rim, so as to be tangential to said rim and thereby reduce the possibility of coming into contact with the tyre during mounting and un-mounting operations.

Said valve-transducer assembly is tightened onto the rim by means of a nut that, by screwing onto the stem of the valve, brings the transducer into contact with the head of the valve and therefore with the head itself, with the interposition of a seal gasket, on the inner edge of the rim.

These valve-transducer assemblies have several limits and disadvantages.

Metallic valves of the clamp-in type are subject to possible damage during final tightening of the nut with which the valve-transducer assembly is fixed to the rim: an improper dosing of the tightening force risks causing the axial rotation of the entire valve-transducer assembly, thus dislodging the transducer out of its seat with respect to its correct position tangential to the rim. Even a minimal rotation of the transducer risks damaging it, for example when changing the tyre.

Furthermore, the centrifugal forces involved and the vibrations of the vehicle when moving can increase the risk of the transducer unscrewing from the valve, if the two components are not securely fixed to one another, or can even cause the nut to loosen.

Moreover, assembly operations, first of the valve onto the transducer, then of the valve-transducer assembly onto the rim, may become disadvantageously long and complicated, given the number of parts involved and the fact that they often need to be manipulated in the confined spaces of the rim, and do not always guarantee the safest, most correct positioning of the components.

Patent application EP 12 77 601 A2 discloses a valve-transducer assembly that tackles these problems, wherein the transducer and the valve body are pre-assembled by means of a fixing screw, the square head of which couples with a seat, having the same shape, belonging to the transducer and the stem of which screws into the valve body.

Tightening of the transducer onto the valve body is completed during the initial phase of tightening the valve onto the rim, which is achieved by means of a specific nut, which can be screwed onto the stem of the valve.

The inside of said nut is provided with a projecting annular element adapted to break while screwing the nut onto the stem of the valve, only when a particular tightening torque is reached, corresponding to the force necessary for the correct tightening of the transducer onto the head of the valve.

Once the projecting annular element has broken, then proceeding with screwing the nut, with higher torque levels, serves to fix the valve-transducer assembly thereby obtained onto the rim.

The solution of providing an annular element with controlled breakage inside the nut to indicate that a certain tightening torque has been reached, although it resolves the aforementioned problems, appears to be complex to manufacture.

In practice, obtaining this annular element by means of a tool working directly on the inside of the nut is not simple, and it is even less easy to guarantee that said element has the precise resistance to breakage that is actually desired.

Operations to check and verify this element on the inside of the nut present difficulties due to the limited amount of operational space available and, therefore, to the limited accessibility to the working and measuring zone.

In the assembly phase too, the possible accidental or imprecise breakage of this element might not be easily visible to the operator.

In the event that said valves are made of aluminum and need to be surface treated to withstand environmental corrosion, application of the protective layer to the inside of the nut could be made even more difficult by the presence of said annular element which, when it broke, would leave a portion of untreated metal exposed.

The constructive disadvantage and reduced reliability of the solution proposed by the aforementioned patent application is therefore apparent.

SUMMARY OF THE INVENTION

The aim of the present invention is therefore to provide a valve whose overall system of assembly with the transducer and the rim is safe and precise, but also simple and fast, and capable of always guaranteeing excellent stability, first between the valve and the transducer during their final coupling, and then when fixing the assembly onto the rim.

These aims are achieved by a metal valve of the clamp-in type for inflating tyres stably associable with a TPMS transducer by means of a locking screw and adapted to be mounted, by means of a fixing system comprising a nut adapted to screw onto a thread provided on the stem of said valve, on a rim of a wheel, wherein said fixing system comprises an element that irreversibly yields when a preset tightening torque is reached for said locking nut, characterized in that said element that irreversibly yields is associated with the stem of said valve.

According to possible embodiments of the invention, said element is irreversibly yielding upon breakage or deformation.

Advantageously, the broken portion of said element is adapted to cooperate with said nut and said stem of said valve, to act as a barrier against the penetration of corrosive agents inside said nut.

According to a first embodiment of the invention, said element has an annular or lobed shape.

According to a further embodiment of the invention, said element is obtained directly from the same material as the stem of said valve, or it can be made with a material placed thereon.

In a particularly preferred embodiment of the invention, said element is obtained by modifying the thread provided on the stem of said valve, such that a portion of said thread has a different pitch or modified coupling tolerance with said nut, so as to define zones with different tightening torques.

According to preferred embodiments of the invention, said element, in relation to different predefined tightening torques, may have different thicknesses or shapes, or it may be made of different materials, and can also be identified with different colors.

Furthermore, the portion of the element that remains visible on the stem of the valve after the breakage or the deformation thereof is adapted to act as an indicator, on the outside of the tyre, of the presence of the transducer on the inside thereof.

The advantages of the invention are apparent, due above all to the valve's simple construction: producing the breakage element directly on the valve body can be done extremely easily when producing the valve itself, and it is always possible to intervene with precision when sizing and conducting dimensional checks, thereby guaranteeing the correct dosage of resistance to breakage that one wishes to confer to the element.

The variant wherein said element is produced with material applied to the valve body is very advantageous: in this case there are various ways of personalizing and differentiating the valve, thanks to the fact that the element can be made of the most suitable material and can have a geometry and thicknesses that are more calibrated to the required performance.

Even more advantageously, if the element is fitted, the integrity of any protective surface treatment on the valve is ensured: breakage of the element does not compromise the continuity of the protective surface, but rather the broken portion of the element closes the space between the nut and the thread, thereby preventing the possible introduction of water or other potentially corrosive agents.

For the purposes of quick identification of the most suitable valve, i.e. of the valve provided with the most suitable yielding element, said element can be characterized by a specific color related to its resistance to torque. The operator will thus be able to more quickly identify the valve most suitable to use.

The presence of the element on the outer surface of the valve stem, whether said element is obtained from the stem or fitted to it, also acts as an indicator, visible from the outside of the rim, of the presence of a TPMS transducer inside the tyre.

Generally speaking, there is also the advantage of the high degree of safety that correct fitting of the valve-transducer assembly confers to the wheel: in this situation too, the risk of detachment of the transducer from the valve during motion of the vehicle is eliminated.

BRIEF DESCRIPTION OF THE DRAWING FIGURES

These and other advantages will become more apparent from the following description of preferred embodiments of the invention, provided by way of non-limiting example, and with the aid of the figures, wherein:

FIGS. 3-5 show a longitudinal section view of a metal valve of the clamp-in type associated with a transducer and fixed to the rim of a wheel, according to possible embodiments of the invention;

FIGS. 7a and 7b show a longitudinal section view of a detail of the valve in the embodiment shown in FIG. 5, in two operational assembly phases.

DETAILED DESCRIPTION OF THE INVENTION

With reference to the Figures, a metal valve of the clamp-in type 1 for inflating tyres 2 is shown, adapted to be stably associated with a transducer 3 using TPMS technology.

Figure 1:
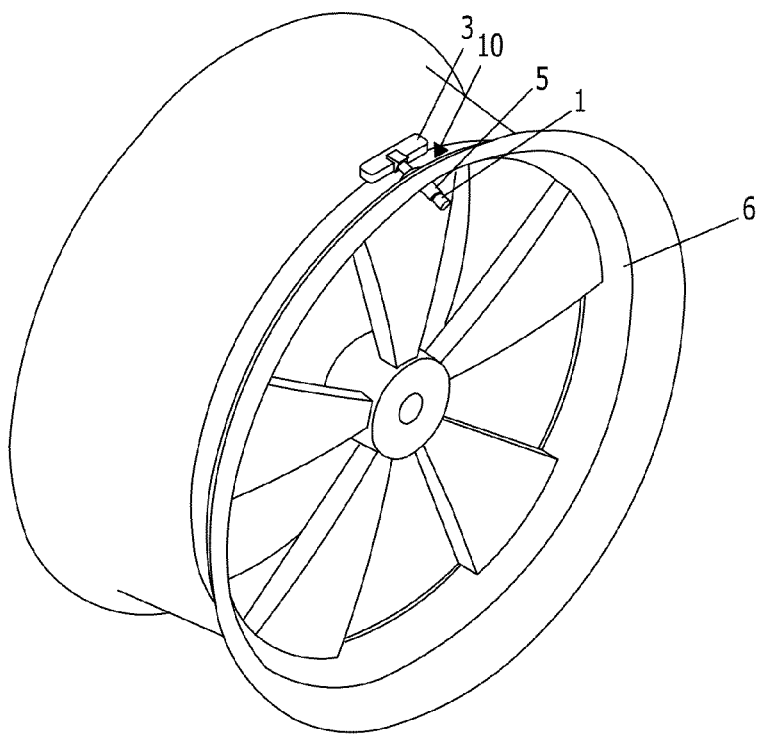
FIGS. 1 and 2 show a perspective and plan view respectively of a valve-transducer assembly for TPMS systems mounted on a wheel rim.
Figure 2:
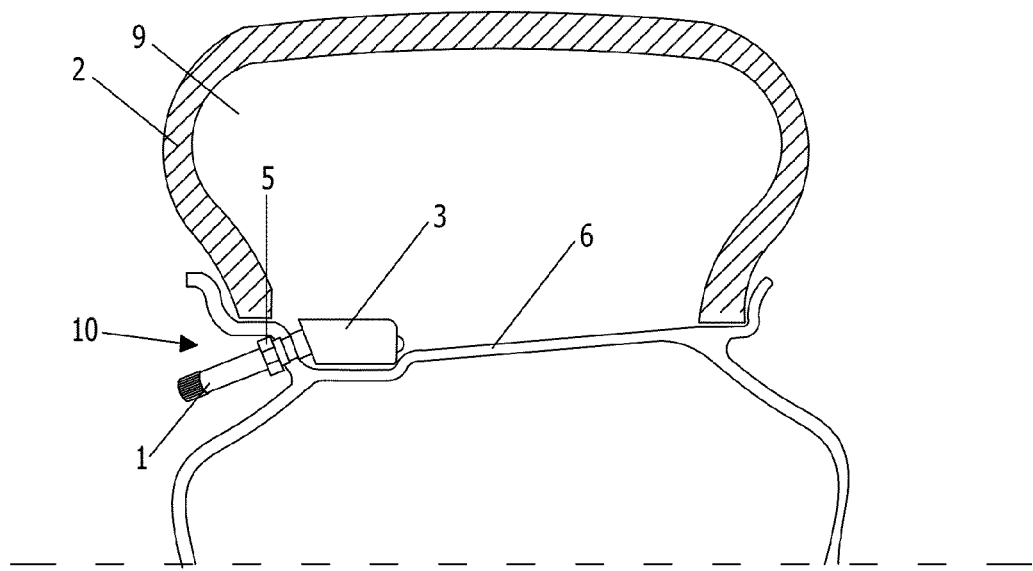

With particular reference to FIGS. 1 and 2, a wheel rim 6 of a motor vehicle is shown, on which said valve 1 and said transducer 3 are fitted, assembled together to form a valve-transducer assembly 10.

In relation to the cross-section view shown, the position of each component of the valve-transducer assembly 10 is apparent, especially with reference to the rim 6.

The transducer 3 is positioned tangential to the rim 6, inside the air chamber 9 delimited by the relative tyre 2, while the valve 1 projects on the outside of the rim 6 and is stably fixed thereto by means of a locking nut 5.

Figure 3:
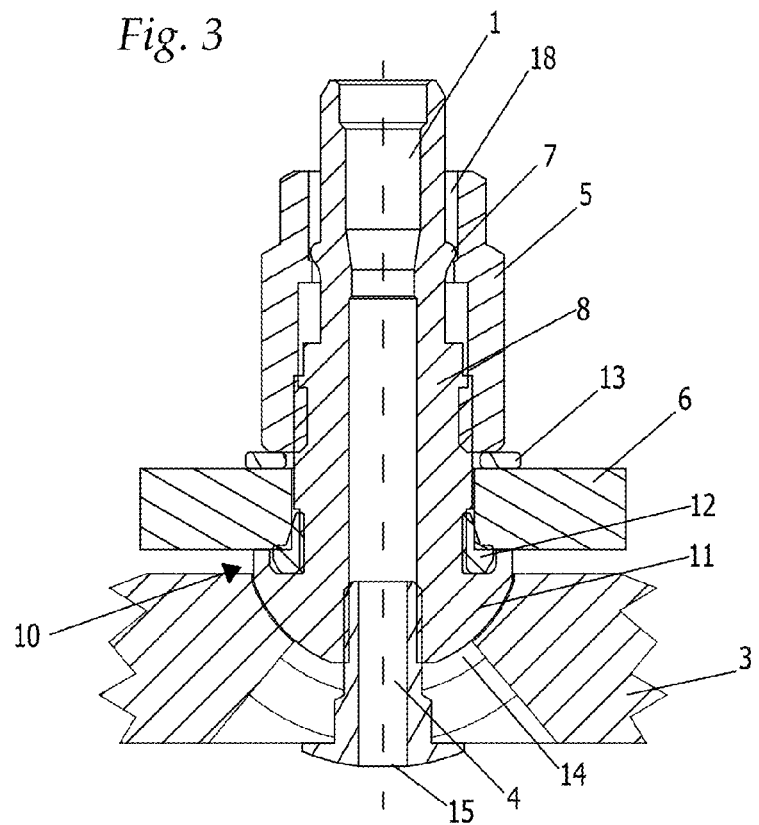
Figure 4:
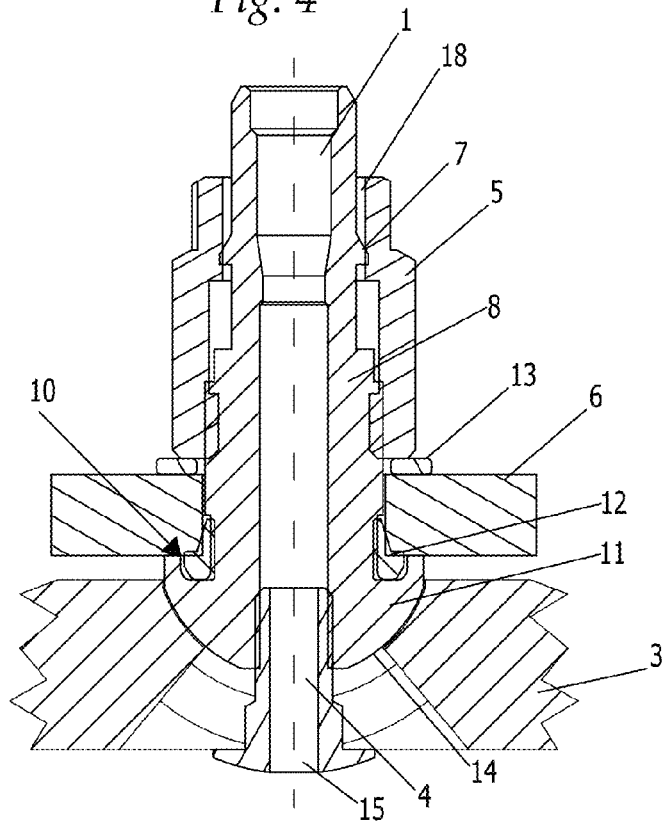

With reference to the cross-section views shown in FIGS. 3-5, possible embodiments of the valve 1 according to the invention are shown in more detail, wherein the valve 1 comprises a stem 8 and a head 11.

Between the inner edge of the rim 6 and the head portion 11 of the valve 1 in contact with the rim, a seal gasket 12 is interposed. Said seal 12 can be elastic (O-Ring) or metallic (Grommet).

Alternatively, the valve head may be in direct contact with the rim, without seals.

Between the outer edge of the rim 6 and the locking nut 5, a washer 13 is usually interposed, made of metallic or plastic material.

With reference to all the accompanying Figures, by way of example only, a particular type of valve 1 of the clamp-in type has been selected, provided with an axially perforated hemispherical head 11. Alternative variants of the valve 1 may comprise cylindrical heads 11, or so-called "hammer" heads, wherein the head-sensor coupling is achieved on two appropriately shaped, symmetrical supporting surfaces, always in accordance with the claims and achieving the same advantages.

For its coupling to the transducer 3, the head 11 of the valve 1 has a specific seat 14 obtained in the transducer 3.

In order to stably associate the two components, both the valve 1 and the transducer 3 are passed through by a perforated screw 4, the head 15 of which has a square or polygonal cross-section, or it may have different shapes for suitable couplings.

The stem of the screw 4 screws onto a thread inside the body of the valve 1, while the square head 15 fits into a corresponding shaped housing in the transducer 3 so that the valve 1 can turn with respect to the screw 4 which, instead, remains stationary with respect to the transducer 3.

This mutual rotation between the valve 1 and the screw 4 is achieved, during the phase of mounting the valve-transducer assembly onto the rim, by means of the nut 5 which rests on a striking element 7 on the stem 8 of the valve 1.

With reference to the cross-section view shown in FIG. 3, said element 7 has annular shape and is obtained directly from the same material as the stem 8 of the valve 1, orthogonally projecting therefrom. In this embodiment, said annular element 7 is irreversibly yielding upon breakage: once the maximum tightening torque for the screw 4 joining the valve 1 to the transducer 3 is reached, said element 7 breaks.

The thickness and shape of said element 7 determines its strength: a thin annular element 7 will break easily and can be used for valves that do not require high tightening torques for the coupling thereof to the transducer. Conversely, if the annular element 7 is thicker, it will break with greater difficulty: in this case, the valve will be stably fixed to its transducer only when a high tightening torque is reached.

Figure 6:
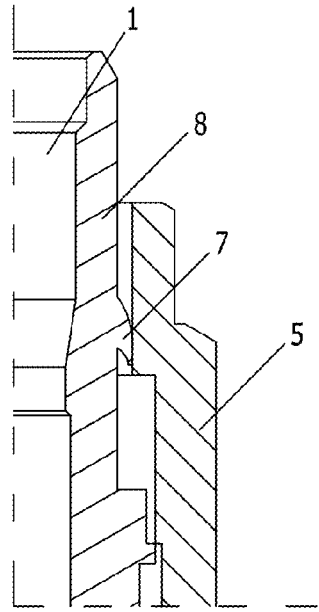
FIG. 6 shows a longitudinal section of a detail of FIG. 4 during a valve fitting phase.

The cross-section view shown in FIG. 4 illustrates a possible alternative embodiment of the valve 1 shown in FIG. 3. In this case, the annular element 7 is irreversibly yielding upon deformation: its cross-section (for example trapezoidal) is shaped so that once the desired tightening torque is reached, the nut 5 irreversibly deforms said element 7, by bending it towards the stem 8 of the valve 1, and then continues screwing (FIG. 6).

In a preferred embodiment, said element 7 may be obtained by modifying the thread 18, provided on the stem 8 of the valve 1, onto which the nut 5 screws.

By dimensionally modifying said thread 18, a zone is created with a different pitch or modified coupling tolerance with the nut, adapted to define differentiated tightening torques: a torque in said zone to definitively fix the valve 1 to the transducer 3, after which the operation can proceed with a torque required to fix the valve-transducer assembly onto the rim 6.

The modified thread, indeed, brakes the advancement of the nut 5 on the stem 8 of the valve 1 until it is stably fixed to the transducer 3, and once the resistance torque has been overcome by breaking or deforming the modified thread, the nut 5 proceeds to screw onto the remaining standard thread, until the valve 1 is stably fixed onto the rim 6.

With reference to the cross-section view shown in FIG. 5, said element 7 is not directly obtained on the valve 1, but is instead fitted, i.e. applied, to its stem 8. Said element 7 is configured as a ring adapted to be axially fitted onto the stem 8 of the valve and then held in position by a specific seat 16 also obtained along the stem 8 of the valve 1, and substantially adapted to avoid the involuntary slippage of the annular element 7 while screwing the nut 5 (FIG. 7a). Said seat 16 can be alternatively replaced by a "nose" or projecting tooth having the same retention function.

In the embodiment illustrated, the applied element 7 is irreversibly yielding upon breakage, but in alternative embodiments a type that is irreversibly yielding upon deformation may be selected.

The version of the valve wherein the element 7 is produced using applied material appears very advantageous since the element itself, an indicator of a predefined tightening torque being reached, can be made of different materials, rather than the metal from which the nut and the entire valve are made, depending on the predefined resistance value that one wants to give said tightening torque.

Even more advantageously, the annular element 7 can be characterized by a specific color that can serve to distinguish it, based once again on the predefined resistance value that one wants to give it.

Even the shape of the element 7 can vary: FIG. 5 illustrates an element with an annular shape, but alternatively, the shape may be lobed and may therefore have more projecting pointed teeth that can be broken (or deformed by bending towards the valve body in the variant wherein the element is yielding upon deformation).

With reference to the detail shown in FIG. 7b, the broken portion 17 of the element 7 is dragged by the nut 5 as it screws: the broken portion 17 is interposed between the nut 5 and the stem 8 of the valve so as to prevent the penetration of corrosive agents between the two threads and to ensure that the coupling lasts longer.

In some particularly preferred embodiments of the invention, the portion 19 of the element 7 that remains on the stem 8 of the valve after its breakage (or the portion deformed by said element in the case that it is yielding upon deformation) remains visible on the outside after the nut is fully tightened, and serves to indicate the presence of a TPMS sensor inside the tyre.

The method of mounting the metal valve 1 onto the rim 6 according to the invention, in association with a transducer 3 for TPMS technology, is described below.

The valve 1 is coupled to the transducer 3 and held in position by means of the screw with a square cross-section 4: in this manner the valve 1 and the transducer 3 are free to mutually rotate while still remaining coupled to one another.

The valve-transducer assembly 10 is then positioned on the rim 6, taking care to place the transducer 3 tangential with the inner edge of the rim 6, and with the stem 8 of the valve 1 projecting outside the rim. This operation is carried out when the valve still does not have a nut.

At this point it is necessary first of all to mutually fix the valve 1 to the transducer 3, and then to tighten the assembly 10 onto the rim 6 by screwing the nut 5.

By acting on the locking nut 5, coaxially with the stem 8 of the valve 1, a first rotation is imparted to said valve, which rotates with respect to the transducer 3, which is instead held tangential to the rim 6.

The valve 1 rotates in unison with the nut 5 until the breakage of the annular element 7 and then until the correct tightening torque is reached, by which the valve 1 and the transducer 3 are stably coupled to one another with no further risk of mutual rotations.

If one continues to rotate the nut 5, the valve 1 now remains stationary and the nut 5 turns on the thread 18 provided on the stem 8 of the valve until it comes into contact with the rim 6, with an interposed washer 13. At this point, all the components are stably coupled to one another and no further mutual rotation is possible.

The invention claimed is:

1. A clamp-in metal valve system configured for inflating tyres associable with a tyre pressure monitoring system transducer, comprising:
   a stem terminating in a head configured to associate with a rim of a wheel;
   a thread provided on the stem;
   a locking nut adapted to screw onto the thread;
   a seat provided in the stem; and an annular element at least partially axially fitted in the seat, the annular element being configured to irreversibly yield when a preset tightening torque is reached for said locking nut, wherein a portion of the annular element that remains visible on the stem of the valve after a breakage of the annular element is adapted to act as an indicator, on an outside of the tyre, of a presence of the transducer on an inside of the tyre.

2. The clamp-in metal valve system according to claim 1, wherein said annular element is irreversibly yielding upon breakage.

3. The clamp-in metal valve system according to claim 2, wherein a broken portion of said annular element is adapted to cooperate with said nut and said stem of said valve to act as barrier against penetration of corrosive agents inside said nut.

4. The clamp-in metal valve system according to claim 1, wherein said annular element has a trapezoidal cross section.

5. The clamp-in metal valve system according to claim 1, wherein said annular element has a lobed shape.

6. The clamp-in metal valve system according to claim 1, wherein said element is obtained directly from a same material as the stem of said valve.

7. The clamp-in metal valve system according to claim 1, wherein said annular element is produced with material applied to the stem of said valve.

8. The clamp-in metal valve system according to claim 7, wherein said annular element is made from different materials corresponding to different tightening torques that can be predefined.

9. The clamp-in metal valve system according to claim 7, wherein said annular element is identified with different colors corresponding to different tightening torques that can be predefined.

10. A valve-transducer assembly which comprises the clamp in metal valve system according to claim 1.

11. A clamp-in metal valve system configured for inflating tyres associable with a tyre pressure monitoring system transducer, comprising:
a stem terminating in a head configured to associate with a rim of a wheel;
a thread provided on the stem;
a locking nut adapted to screw onto the thread;
a seat provided in the stem; and
an annular element at least partially in the seat, the annular element being configured to irreversibly yield when a preset tightening torque is reached for said locking nut so that a broken portion of said annular element is located between said nut and said stem to act as barrier against penetration of corrosive agents inside said nut, wherein a portion of the annular element that remains visible on the stem of the valve after a breakage of the annular element is adapted to act as an indicator, on an outside of the tyre, of a presence of the transducer on an inside of the tyre.

12. The clamp-in metal valve system according to claim 11, wherein said annular element is irreversibly yielding upon breakage.

13. The clamp-in metal valve system according to claim 12, wherein a broken portion of said annular element is adapted to cooperate with said nut and said stem of said valve to act as barrier against penetration of corrosive agents inside said nut.

14. The clamp-in metal valve system according to claim 11, wherein said annular element has a trapezoidal cross section.

15. The clamp-in metal valve system according to claim 11, wherein said annular element has a lobed shape.

16. The clamp-in metal valve system according to claim 11, wherein said element is obtained directly from a same material as the stem of said valve.

17. The clamp-in metal valve system according to claim 11, wherein said annular element is produced with material applied to the stem of said valve.

18. The clamp-in metal valve system according to claim 17, wherein said annular element is made from different materials corresponding to different tightening torques that can be predefined.

19. The clamp-in metal valve system according to claim 17, wherein said annular element is identified with different colors corresponding to different tightening torques that can be predefined.

* * * * *